US010093056B2

(12) United States Patent
Dimmler et al.

(10) Patent No.: US 10,093,056 B2
(45) Date of Patent: Oct. 9, 2018

(54) OPERATING UNIT FOR AN INJECTION MOLDING MACHINE

(71) Applicant: ENGEL AUSTRIA GmbH, Schwertberg (AT)

(72) Inventors: Gerhard Dimmler, Steinhaus (AT); Josef Giessauf, Perg (AT); Rainer Hoelzl, Tragwein (AT); Albin Kern, Schwertberg (AT); Friedrich Mairhofer, Naarn im Machland (AT); Helmut Steinparzer, Steyr (AT); Johann Voggeneder, Mauthausen (AT); Karl Wiesinger, Neuhofen/Krems (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 623 days.

(21) Appl. No.: 14/087,437

(22) Filed: Nov. 22, 2013

(65) Prior Publication Data
US 2014/0147540 A1 May 29, 2014

(30) Foreign Application Priority Data
Nov. 26, 2012 (AT) .................................. 1240/2012

(51) Int. Cl.
*B29C 45/76* (2006.01)
*B29C 45/17* (2006.01)

(52) U.S. Cl.
CPC .......... *B29C 45/76* (2013.01); *B29C 45/1774* (2013.01); *B29C 2045/7606* (2013.01)

(58) Field of Classification Search
CPC ........ B29C 45/1774; B29C 2045/7606; B29C 45/76; C08G 18/482

(Continued)

(56) References Cited

U.S. PATENT DOCUMENTS 5,470,218 A * 11/1995 Hillman ................ B29C 45/768
264/40.6
5,539,650 A * 7/1996 Hehl ............................ 700/200

(Continued)

FOREIGN PATENT DOCUMENTS

AT          511 487        12/2012
DE     10 2006 019 598    11/2006

(Continued)

OTHER PUBLICATIONS

Austrian Patent Office Search Report dated Oct. 4, 2013 in Austrian Patent Office No. A 1240/2012.

(Continued)

*Primary Examiner* — Yogendra N Gupta
*Assistant Examiner* — Emmanuel S Luk
(74) *Attorney, Agent, or Firm* — Wenderoth, Lind & Ponack, L.L.P.

(57) ABSTRACT

An operating unit has an operating program and a touch-sensitive display screen on which display fields and/or navigation fields can be represented. Upon actuation of the operating fields, operating signals can be sent by a control or regulating device to injection molding machine elements. Upon actuation of the navigation fields, pages of the operating program can be called up. At least one operating group contains the operating fields but no navigation fields, and/or navigation groups contain the navigation fields but no operating fields. At least one passive field in the form of rows and/or columns contains neither operating fields nor navigational fields. The least one operating group and/or the navigation groups is arranged in rows and/or columns, and the at least one passive field is arranged between the navigation groups and/or the at least one operating group.

13 Claims, 2 Drawing Sheets

(58) Field of Classification Search
USPC .................................. 425/162, 169; 700/204
See application file for complete search history.

(56) References Cited

U.S. PATENT DOCUMENTS

| | | | |
|---|---|---|---|
| 5,611,975 A * | 3/1997 | Kamiguchi et al. | 264/40.1 |
| 5,788,851 A * | 8/1998 | Kenley | A61M 1/14 |
| | | | 210/143 |
| 6,009,354 A * | 12/1999 | Flamme | A01B 79/005 |
| | | | 172/4.5 |
| 6,032,122 A * | 2/2000 | Gertner et al. | 715/772 |
| 6,073,059 A * | 6/2000 | Hayashi et al. | 700/204 |
| 6,338,004 B1 | 1/2002 | Usui | 700/200 |
| 6,618,041 B2 * | 9/2003 | Nishizawa | 345/173 |
| 6,682,670 B2 * | 1/2004 | Lullwitz et al. | 264/40.3 |
| 6,684,264 B1 * | 1/2004 | Choi | 710/15 |
| 6,915,182 B2 * | 7/2005 | Usui et al. | 700/204 |
| 7,346,425 B2 * | 3/2008 | Nishizawa et al. | 700/200 |
| 7,421,309 B2 | 9/2008 | Nishizawa et al. | |
| 7,918,661 B2 * | 4/2011 | Busse et al. | 425/163 |
| 9,142,253 B2 * | 9/2015 | Ubillos | G11B 27/034 |
| 9,229,607 B2 * | 1/2016 | Powers | G06F 3/0484 |
| 2003/0018395 A1 * | 1/2003 | Crnkovich | G05B 15/02 |
| | | | 700/11 |
| 2003/0138512 A1 * | 7/2003 | Girotto et al. | 425/150 |
| 2004/0088066 A1 | 5/2004 | Yamazaki et al. | |
| 2004/0093115 A1 * | 5/2004 | Usui | B29C 45/768 |
| | | | 700/204 |
| 2004/0181293 A1 | 9/2004 | Tanizawa et al. | |
| 2006/0122723 A1 * | 6/2006 | Ninomiya | 700/106 |
| 2006/0157880 A1 * | 7/2006 | Hehl | 264/40.1 |
| 2006/0247821 A1 | 11/2006 | Nishizawa et al. | |
| 2007/0009627 A1 * | 1/2007 | Konishi | 425/162 |
| 2007/0156279 A1 * | 7/2007 | Dailey | 700/197 |
| 2008/0069915 A1 | 3/2008 | Busse et al. | |
| 2008/0155458 A1 * | 6/2008 | Fagans | G06F 3/04817 |
| | | | 715/781 |
| 2008/0229248 A1 * | 9/2008 | Fagans | G06F 17/30265 |
| | | | 715/838 |
| 2008/0288869 A1 * | 11/2008 | Ubillos | G06F 17/30265 |
| | | | 715/716 |
| 2012/0119419 A1 * | 5/2012 | Yeager et al. | 264/328.1 |
| 2013/0103184 A1 * | 4/2013 | Morikawa | B22D 17/32 |
| | | | 700/197 |
| 2014/0053070 A1 * | 2/2014 | Powers | G06F 3/0484 |
| | | | 715/708 |

FOREIGN PATENT DOCUMENTS

| | | |
|---|---|---|
| EP | 0 216 939 | 4/1987 |
| EP | 1 785 794 | 5/2007 |
| EP | 1 902 827 | 3/2008 |
| JP | 2001-145947 | 5/2001 |

OTHER PUBLICATIONS

SELOGICA Control: Comprehensive management for injection molding technology. Product information [online]. ARBURG GmbH + CoKG, Apr. 2012, Download from the interne: <URL:http://pdf.directindustry.de/pdf/arburg/selogica/7258-302110.html>, the entire document, in particular screen 4 and 5, downloaded on Apr. 10, 2013.

European Search Report dated Mar. 12, 2014 in corresponding European Application No. EP 13 00 5369, with English translation.

* cited by examiner

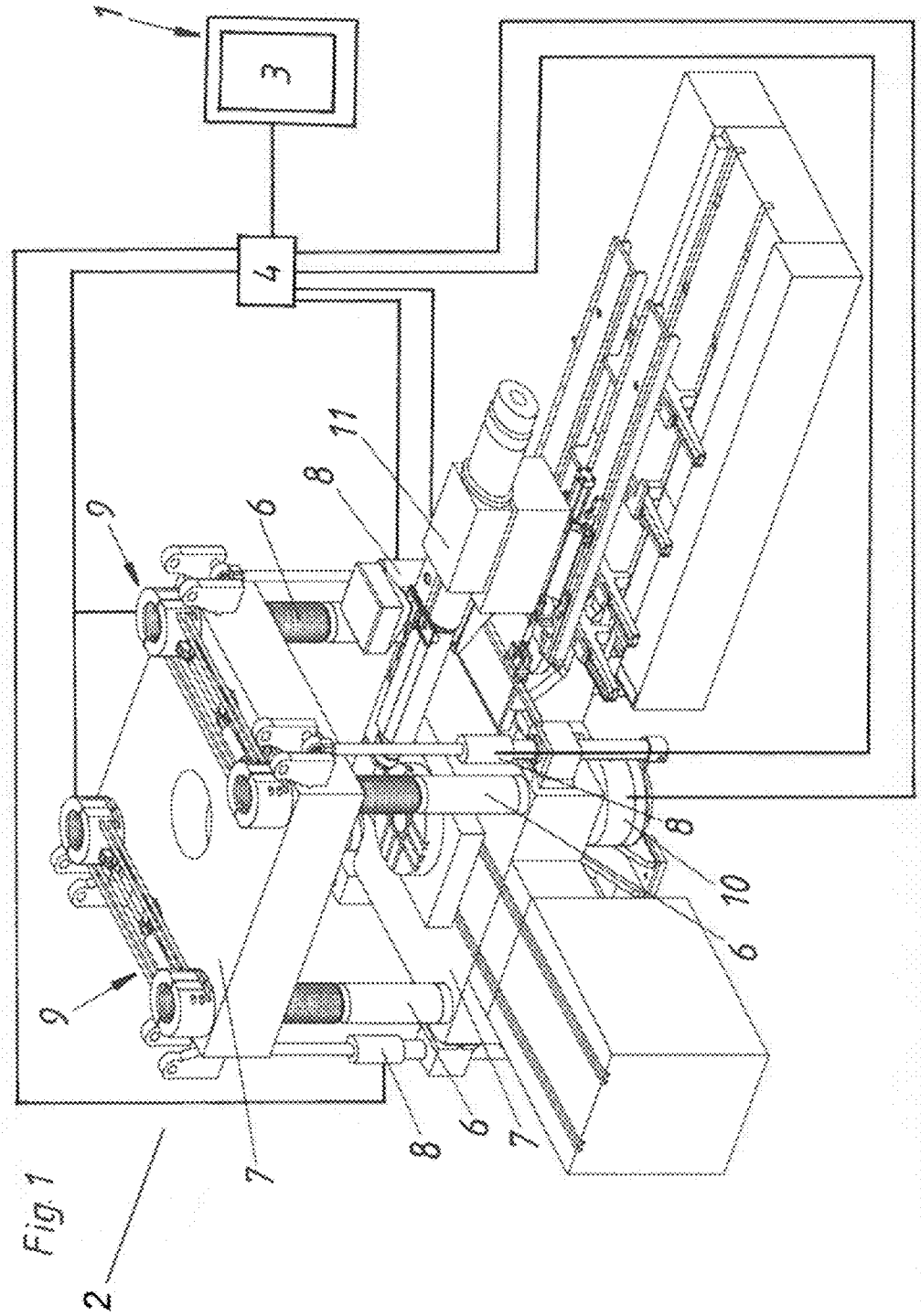

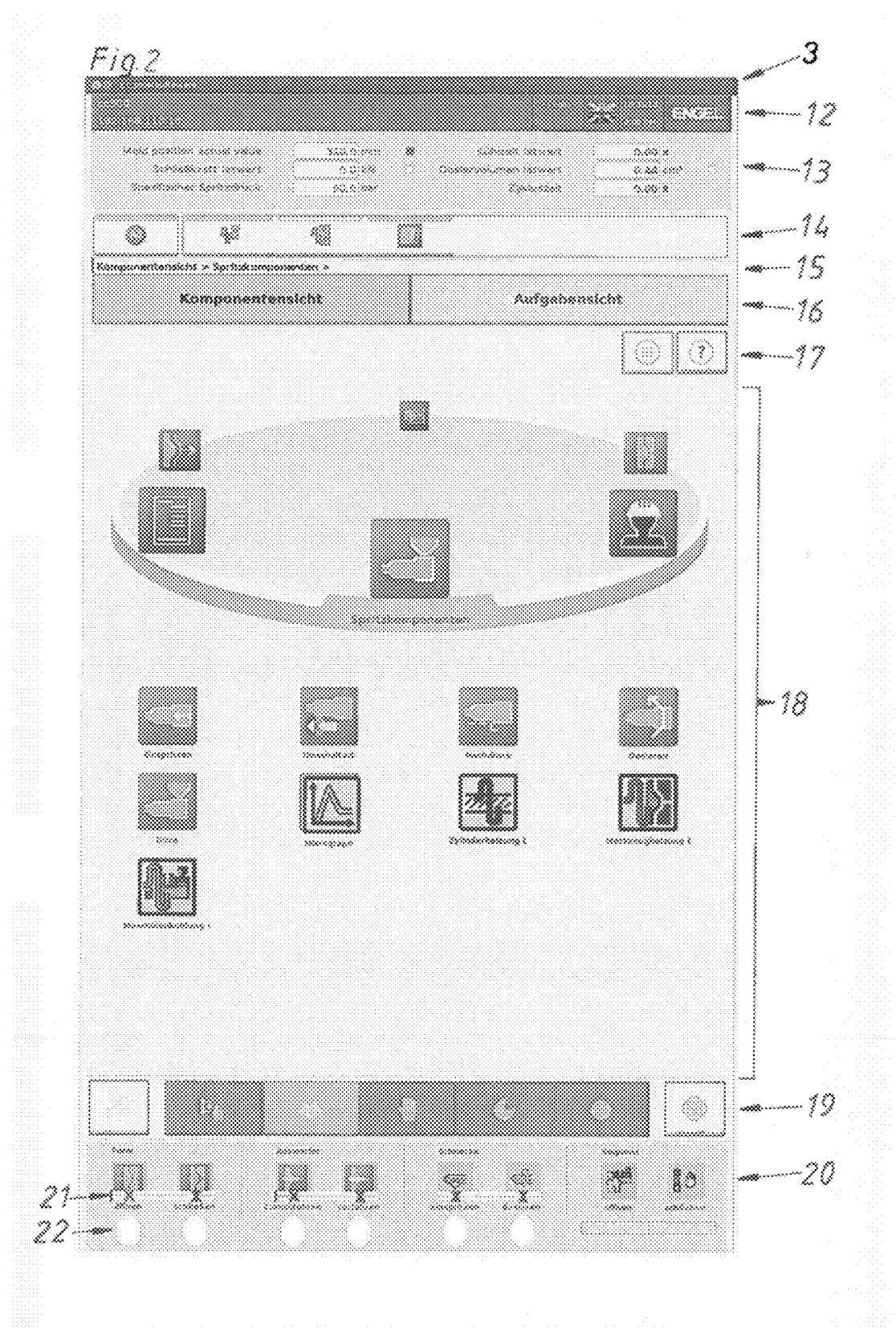

OPERATING UNIT FOR AN INJECTION MOLDING MACHINE

BACKGROUND OF THE INVENTION

The present invention concerns an operating unit for an injection molding machine having the features of a classifying portion, and an injection molding machine having such an operating unit.

It has been the standard for some time for the operating units of injection molding machines to be equipped with touch-sensitive display screens. As an example, mention is to be made of the Austrian patent application bearing the filing No A 851/2011 to the present applicant, which is not a prior publication.

Operation by means of a touch-sensitive display screen admittedly affords obvious advantages, but the structure disclosed in the above patent application is worthy of improvement. As the space on the touch-sensitive display screen is limited, the above-mentioned application provides that the keys or buttons for menu control are arranged separately outside the display screen. That makes fluent operation difficult as it is in fact always necessary to look for the correct button and the operator is not intuitively guided to his aim, as would be possible in the case of menu control by means of a touch display. The obvious measure of simply integrating the buttons for menu control on the touch-sensitive display screen is not appropriate as a high degree of susceptibility to error would occur for reasons of space.

SUMMARY OF THE INVENTION

The object of the invention is to provide an operating unit for an injection molding machine, which allows fluent and in particular error-free operation of the injection molding machine.

That object is effected by groups of operating fields on a touch-sensitive display screen, the actuation of which triggers operating signals sent by the control or regulating device to injection molding machine elements, and groups of navigation fields on the touch-sensitive display screen which serve for navigation within the operating program (i.e., calling up pages of the operating program). The operating fields and navigation fields are so arranged that there are always passive fields between them, and passive fields represent information about the injection molding machine, but do not contain operating fields or navigation fields. Thus, passive fields are between "interactive" groups which include operating fields and navigation fields on the touch-sensitive display screen. That prevents unwanted activities on the part of the injection molding machine being triggered by unintentional actuation of operating fields or navigation fields, or unwanted pages of the operating program being called up.

For optimum utilization of space, information about the injection molding machine can be represented in the at least one passive field.

To achieve a good compromise between utilization of space and error avoidance, the at least one passive field, when it is in the form of a row, is of a height of a minimum of 0.5 cm, preferably a minimum of 1 cm, and/or that the at least one field, if it is in the form of a column, is of a width of a minimum of 0.5 cm, preferably a minimum of 1 cm.

A further preferred embodiment is one in which at least one navigation field is arranged on at least two different pages of the operating program on the display screen, and on the same position as that is conducive to fluent operation of the injection molding machine.

Further, an injection molding machine can have an operating unit according to the invention.

BRIEF DESCRIPTION OF THE DRAWINGS

Further advantages and details of the invention will be apparent from the Figures and the related specific description, in which:

FIG. 1 shows an example of an injection molding machine with an operating unit according to the invention, and FIG. 2 shows an example of an arrangement according to the invention of operating groups, navigation groups, and passive fields.

DETAILED DESCRIPTION OF THE INVENTION

FIG. 1 shows an injection molding machine 2 having mold mounting plates 7, quick-action stroke members 8, bar members 6, locking mechanisms 9, pressure mechanisms 10, and an injection unit 11. The Figure diagrammatically shows an operating unit 1 having a touch-sensitive display screen 3 and a control or regulating device 4 which is connected to the operating unit 1 and which is itself connected to the above-mentioned elements of the injection molding machine.

FIG. 2 shows an example of the arrangement according to the invention of the navigation groups (containing navigation fields but no operating fields), the operating groups (containing operating fields but no navigation fields (in which at least one of the navigation groups and operating groups form an interactive group), and the passive fields on the display screen 3 of the operating unit 1. In this embodiment, an arrangement in rows is selected, which however is not essential, for it is equally possible to select a column arrangement or a hybrid form. Disposed at the top is the status/alarm bar 12. By means of bar 12, it is possible for example to navigate to an alarm page or to a page for user login. Disposed beneath the status/alarm bar 12 is a passive field which is in the form of an information panel 13, on which various parameters of the injection molding machine 2 and/or automation (for example handling equipment) can be represented. Adjoining the information panel 13, it is possible to see the drive and heating bar 14, by way of which dialogs for controlling various drives and heating devices of the injection molding machine 2 can be called up. Disposed beneath the drive and heating bar 14 is a passive field which is in the form of a path bar 15. Disposed beneath the path bar 15 once again is a block comprising title bar 16, function region 17, working region 18, operating mode bar 19, and hand button allocation bar 20.

Frequently, required menu points like pressing and auxiliary themes can be reached with the function region 17. A wide range of different pages, for example for setting a wide range of different parameters of the injection molding machine, can be represented in the working region 18. Various operating modes for the injection molding machine like, for example, automatic operation, set-up mode or learning mode can be selected by way of the operating mode bar 19.

The hand button bar 22 is again separated from above active regions by a passive status information bar 21. In that respect, the status information bar 21 presents status information relating to activities of injection molding machine elements which can be triggered by the hand buttons, possibly with haptic feedback, in the hand button bar 22.

There is only one operating group in this embodiment, namely the hand button bar 22. It is, however, readily conceivable to provide a plurality of operating groups.

The invention claimed is:

1. An operating unit for operating an injection molding machine, said operating unit comprising:
    an operating program embodied in a control device; and
    a touch-sensitive display screen on which at least one of operating fields and navigation fields is represented, said touch-sensitive display screen interacting with the control device;
    wherein said operating program and said touch-sensitive display screen are configured:
        such that, upon actuation of an operating field on said touch-sensitive display screen, operating signals are sent by the control device to elements of the injection molding machine and, upon actuation of a navigation field on said touch-sensitive display screen, pages of said operating program are called up;
        to include an interactive group consisting of at least one of:
            at least one operating group containing operating fields but no navigation fields and arranged in at least one of rows and columns on said touch-sensitive display screen; and
            at least one navigation group containing navigation fields but no operating fields and arranged in at least one of rows and columns on said touch-sensitive display screen; and
        to include at least one passive field arranged in at least one of rows and columns on said touch-sensitive display screen, said at least one passive field representing information about the injection molding machine but containing neither operating fields nor navigational fields, said at least one passive field being arranged between members of said interactive group.

2. The operating unit as set forth in claim 1, wherein each of said at least one passive field is formed as a row having a height of at least 0.5 cm.

3. The operating unit as set forth in claim 2, wherein each of said at least one passive field has a height of at least 1.0 cm.

4. The operating unit as set forth in claim 2, wherein said interactive group includes at least one navigation group having a navigation field arranged at the same position on at least two different pages of said operating program.

5. An injection molding machine comprising said operating unit as set forth in claim 2.

6. The operating unit as set forth in claim 1, wherein each of said at least one passive field is formed as a column having a width of at least 0.5 cm.

7. The operating unit as set forth in claim 6, wherein each of said at least one passive field has a width of at least 1.0 cm.

8. The operating unit as set forth in claim 6, wherein said interactive group includes at least one navigation group having a navigation field arranged at the same position on at least two different pages of said operating program.

9. An injection molding machine comprising said operating unit as set forth in claim 6.

10. The operating unit as set forth in claim 1, wherein said interactive group includes at least one navigation group having a navigation field arranged at the same position on at least two different pages of said operating program.

11. An injection molding machine comprising said operating unit as set forth in claim 10.

12. An injection molding machine comprising said operating unit as set forth in claim 1.

13. An operating unit for an injection molding machine, comprising:
    an operating program embodied in a control device; and
    a touch-sensitive display screen for displaying at least one of operating fields and navigation fields, said touch-sensitive display screen interacting with the control device;
    wherein, upon actuation of said operating fields on said touch-sensitive display screen, operating signals are sent by the control device to elements of the injection molding machine and, upon actuation of said navigation fields on said touch-sensitive display screen, pages of said operating program are called up;
    wherein said operating program and said touch-sensitive display screen are configured to include at least one passive field and at least one of a group of at least one operating group and at least one navigation group on said touch-sensitive display screen;
    wherein said at least one operating group contains operating fields but no navigation fields, said at least one navigation group contains navigation fields but no operating fields, and said at least one passive field contains neither operating fields nor navigation fields;
    wherein each of said at least one operating group, said at least one navigation group, and said at least one passive field are arranged in rows or columns on said touch-sensitive display screen;
    wherein said at least one passive field is arranged between navigation groups, between operating groups, or between at least one navigation group and at least one operating group on said touch-sensitive display screen; and
    wherein information about said injection molding machine is represented in said at least one passive field.

* * * * *